United States Patent
Schupbach et al.

(10) Patent No.: US 8,641,084 B2
(45) Date of Patent: Feb. 4, 2014

(54) AGEING-RESISTANT MOUNTING FOR INFLATABLE AIRBAG MODULE

(75) Inventors: Thierry Schupbach, Meru (FR); Daniel Ory, Le-Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/575,615

(22) PCT Filed: Jan. 27, 2011

(86) PCT No.: PCT/EP2011/000366
§ 371 (c)(1),
(2), (4) Date: Oct. 15, 2012

(87) PCT Pub. No.: WO2011/092015
PCT Pub. Date: Aug. 4, 2011

(65) Prior Publication Data
US 2013/0140798 A1      Jun. 6, 2013

(30) Foreign Application Priority Data

Jan. 29, 2010   (FR) ...................................... 10 50619

(51) Int. Cl.
*B60R 21/20*        (2011.01)
(52) U.S. Cl.
USPC ..................................................... 280/728.3
(58) Field of Classification Search
USPC ................................... 280/728.3, 732, 728.2
See application file for complete search history.

(56) References Cited

U.S. PATENT DOCUMENTS

| | | | |
|---|---|---|---|
| 5,851,023 A | 12/1998 | Nagata et al. | |
| 2004/0119267 A1* | 6/2004 | Cowelchuck et al. | 280/728.3 |

FOREIGN PATENT DOCUMENTS

| | | |
|---|---|---|
| DE | 19930754 | 1/2000 |
| DE | 102007023075 | 11/2008 |

OTHER PUBLICATIONS

International Search Report for PCT/EP2011/000366 dated May 11, 2011, 2 pages (translated).

* cited by examiner

*Primary Examiner* — Faye M. Fleming
(74) *Attorney, Agent, or Firm* — Reising Ethington P.C.

(57) ABSTRACT

The invention relates to a mounting (4) for an inflatable airbag (6) module intended to be fitted on a lower face (3) of a motor vehicle dashboard (2). This mounting forms a firing channel in which the airbag is guided in order to be deployed towards the passenger compartment through the dashboard (2). It comprises an upper wall (9) intended to be fixed to the lower face (3) of the dashboard (2) and an upper face (18) to which the module (6) is intended to be fixed. This mounting (4) has a top portion (7) and a bottom portion (8) which are secured rigidly to one another and are produced from two different materials, with the material of the top portion (7) being more flexible than the material of the bottom portion (8). The invention applies to motor vehicle safety.

14 Claims, 1 Drawing Sheet

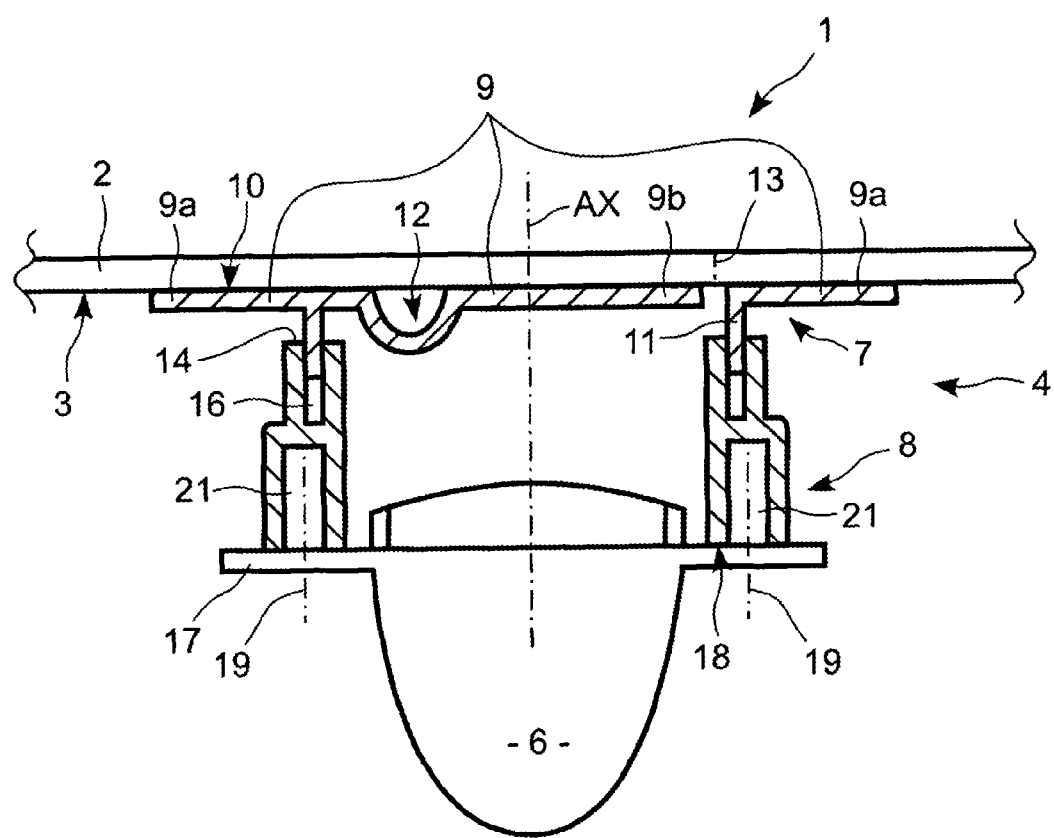

AGEING-RESISTANT MOUNTING FOR INFLATABLE AIRBAG MODULE

TECHNICAL FIELD

The invention concerns a mounting intended to bear an inflatable airbag module mounted below the dashboard body of a motor vehicle.

BACKGROUND OF THE INVENTION

In such an arrangement, the dashboard which is located in the cab below the windscreen comprises a dashboard body with a lower face carrying an inflatable airbag module. In concrete terms, this module, which comprises an enclosure for the airbag and its inflation means, is mounted facing a delimited opening in the dashboard body.

The opening, which is generally rectangular, is defined for example by one or more weakening lines constituting as applicable one or two flaps intended to open on deployment of the airbag. The mounting which constitutes a firing channel for the airbag is located below the lower face of the dashboard body to which it is fixed and the airbag module it carries is attached to the lower face of the mounting.

This mounting is thus interposed between a flat, standardized airbag module fixing surface and the lower face of the dashboard body which is curved, the form of which varies from one vehicle model to the next.

The upper face of the dashboard body is a surface with a substantially continuous curvature which may be covered with a covering typically comprising a foam and a skin, the inflatable airbag being arranged virtually invisibly at the upper face.

When an impact is detected, the airbag inflates and exerts a pressure on the inner face of the flap or flaps, thus causing the opening, against the covering which tears. This opening allows the airbag to deploy through the dashboard towards the cab to protect a vehicle occupant in the case of impact.

As the dashboard extends over a relatively large area, in particular over the entire width of the vehicle in which it is fitted, and its body is made of a relatively flexible material, its form or curvature changes significantly as the vehicle ages, in particular taking into account the substantial thermal variations resulting namely from the extensive exposure to sunlight of such a dashboard.

In practice, the shape of the module mounting becomes apparent on the upper face of the dashboard: the form of the dashboard changes while that of the mounting fixed to the dashboard does not change because the mounting is made of a more rigid material than the dashboard. In concrete terms, the shape of the module mounting becomes apparent on the upper face of the dashboard body.

One solution to solve this problem consists of producing the mounting from a material with a flexibility comparable to that of the dashboard body.

In this case the mounting deforms with the dashboard over the life of the vehicle such that, despite the deformation of this dashboard, the shape of the mounting remains invisible on the upper face of the dashboard body.

In this case however the fixing of the inflatable airbag module to the mounting is problematical as the mounting material is too flexible to allow a fixing with sufficient mechanical strength. This problem is all the greater as it can result in the detachment of the module when the airbag inflates.

In the case of detachment of the module, the airbag cannot exert sufficient pressure on the rear face of the dashboard body to allow opening of the flap, such that the airbag simply cannot deploy into the cab.

OBJECT OF THE INVENTION

The object of the invention is to propose an arrangement that helps maintain the module mounting invisible as the vehicle ages, while offering a module fixing with sufficient mechanical strength.

SUMMARY OF THE INVENTION

To this end, the object of the invention is an inflatable airbag mounting module intended to be mounted on a lower face of a dashboard of a motor vehicle and to extend under this lower face, this mounting constituting a firing channel forming a closed contour in which the airbag is guided to deploy towards the cab through the dashboard, the mounting comprising an upper portion for fixing to the dashboard and a lower portion receiving the module, characterized in that the upper portion and the lower portion are two separate parts rigidly connected together while being made of two different materials, the material of the upper portion being more flexible than the material of the lower portion.

With this solution the upper portion of the mounting deforms with the dashboard during ageing such that the mounting remains invisible, and the lower portion which is attached to the upper portion is made of a sufficiently rigid material to constitute a fixing of the module with the required mechanical strength. The invention also concerns a mounting as defined above in which the upper portion and lower portion respectively delimit an upper part and a lower part of the firing channel and in which the lower portion is rigidly connected to the upper portion by over molding.

The invention also concerns a mounting as defined above wherein the upper portion is a separate element from the dashboard.

The invention also concerns a mounting as defined above wherein the inflatable airbag module is fixed to the lower portion by means of separate elements.

The invention also concerns a mounting as defined above wherein the inflatable airbag module is fixed to the lower portion by means of screws passing through this module on being screwed into the thickness of this lower portion.

The invention also concerns a mounting as defined above wherein the material of the lower portion is a composite material comprising glass-fiber reinforced polypropylene.

The invention also concerns a mounting as defined above wherein the material of the upper portion is a thermoplastic elastomer-type material.

The invention also concerns an inflatable airbag comprising a dashboard and an inflatable airbag module carried by a mounting as defined above.

The invention also concerns an arrangement of an inflatable airbag comprising a dashboard and an inflatable airbag module carried by a mounting as defined above, the upper part of which is integrated in the dashboard.

The only FIGURE is a view showing the mounting according to the invention in cross section when mounted on the lower face of a dashboard and carrying an inflatable airbag module.

DETAILED DESCRIPTION OF THE INVENTION

The basic concept of the invention is to provide a module mounting, the upper portion of which is flexible to follow the deformation of the dashboard during ageing, and the lower portion of which is rigid to constitute a fixing means for the module which has sufficient mechanical strength.

The arrangement of the inflatable airbag generally indicated as 1 in the single FIGURE comprises a dashboard body 2 with a lower face 3 to which is attached a mounting 4 which in turn carries the inflatable airbag module 6.

The mounting 4 according to the invention comprises an upper portion 7 fixed to the lower face of the dashboard body, this upper portion being made of relatively flexible material, extended by a lower portion 8 which itself is made of a more rigid material in order to receive the inflatable airbag module.

As will be understood and as can be seen in FIG. 1, the mounting 4 is a separate part of the dashboard to which it is fixed.

The upper portion 7 of the mounting 4 comprises an upper wall 9 which is here generally flat, the upper face of which is fixed directly to the lower face 3 of the dashboard body 2, and an upper circumferential wall 11 extending beyond the lower face of the wall 9 and perpendicular thereto.

The upper circumferential wall 11 extends around an axis AX which is perpendicular to the dashboard body and corresponds to the direction in which the inflatable airbag deploys, such that this wall delimits the upper part of the firing channel formed by the mounting 4. Viewed from above i.e. when viewed in direction AX, the circumferential wall defines a closed contour of circular, square, rectangular or other shape.

In the example of the drawing which is diagrammatic, the dashboard body 2 is flat and the upper wall 9 of the mounting 4 is itself also flat. The dashboard body 2 however is more often curved, and similarly the upper wall 9 is also curved so as to follow the form of the dashboard body to which it is attached by bonding, ultrasound welding or similar.

The upper wall 9 comprises firstly a peripheral region 9a which surrounds the circumferential upper wall 11 extending it laterally, and a central region 9b of this upper wall 9 which corresponds to a reinforcing panel of a flap which opens on deployment of the airbag.

As shown in the FIGURE, one side of the central part 9b of the upper wall 9 is separated from the circumferential wall 11 by a portion 12 which is spaced from and separate from the lower face 3 so as to constitute a hinge. The opposite side of the central part 9b is itself spaced from the circumferential wall 11 thus constituting a discontinuity of the upper wall. The dashboard body 2 comprises a weakening line 13 forming a rupture starting point, delimiting the flap and located at this discontinuity.

In practice, when the inflatable airbag is deployed, it exerts forces on the lower face of the central part 9b of wall 9 which cause the tearing of the dashboard body 2 to allow opening of the flap by pivoting about a region 12 forming a hinge, which enables the airbag to deploy towards the cab through the dashboard.

The lower portion 8 of the mounting 4 constitutes a circumferential wall delimiting the lower part of a firing channel formed by the mounting 4. This lower circumferential wall has a thickness substantially greater than that of the upper circumferential wall 11 which it extends. Viewed from above along axis AX, it has a general shape corresponding to a closed circular, square or rectangular contour, corresponding to that of the upper circumferential wall 11 viewed from above.

As evident from the only FIGURE, the upper edge 14 of the lower portion 8 comprises in its upper face 10 a circumferential groove 16 in which the lower edge of the upper circumferential wall 11 is engaged. In more concrete terms, the upper part of the lower portion 8 is molded around the lower edge of the circumferential wall 11 so as to be rigidly connected to the upper portion 7.

As indicated above, the lower circumferential wall formed by the lower portion 8 has a thickness substantially greater than that of the upper circumferential wall 11 so that it can receive the fixing elements of the airbag module 6. These fixing elements may be screws, inserts, dowels or nuts.

More particularly the module 6 comprises a flat panel 17 of dimensions greater than those of the lower portion 8 viewed from above, and which is applied against the lower face 18 i.e. the lower edge of the lower portion 8 is fixed thereto.

This fixing is achieved by means of a set of screws (not shown) passing through the panel 17 and the lower edge 18 to be screwed into the thickness of the wall formed by the lower portion 8. These screws are shown symbolically by two dotted lines 19 and corresponding holes which may be threaded are marked by 21.

In the example of the FIGURES, the upper portion 7 is made of a material compatible with the material of the dashboard body, this material being typically a thermoplastic elastomer (TPE) which has a suitable flexibility to deform together with the dashboard body. Where applicable the upper portion may be molded together with the remainder of the dashboard body.

Advantageously the upper portion is made of a material with a flexibility which is greater than that of the material of which the dashboard is made.

With regard to the lower portion, advantageously it is made of a composite material comprising polypropylene which may contain glass fibers (PPGF). This material is sufficiently rigid and hard to receive the fixing screws of the airbag module or anchoring elements of any other fixing means able to bear the forces exerted by the airbag when deployed in the firing channel.

This lower portion 8 may also be made of other materials where these have appropriate mechanical characteristics of rigidity and strength. For example it can be made of acrylonitrile butadiene styrene alloy with polycarbonate (ABS/PC), or polyamide reinforced with glass fibers (PA/GF).

The invention claimed is:

1. A mounting for an inflatable airbag module comprising an airbag and intended to be mounted on a lower face of a curved dashboard installed in a cab of a motor vehicle and to extend under this lower face, this mounting constituting a firing channel forming a closed contour in which the airbag is guided to deploy towards the cab through the dashboard, the mounting comprising an upper portion having a curved upper face for fixing to the curved dashboard and a lower portion having a flat lower face to which the module is to be fixed, characterized in that the upper portion and the lower portion are two separate parts rigidly connected together while being made of two different materials, the material of the upper portion being more flexible than the material of the lower portion, the flexibility of the upper portion allowing it to follow the deformation of the dashboard during ageing.

2. The mounting as claimed in claim 1, wherein the upper portion and the lower portion respectively delimit an upper part and a lower part of the firing channel and wherein the lower portion is rigidly connected to the upper portion by over molding.

3. The mounting as claimed in claim 1, the upper portion of which is a separate element from the dashboard.

4. The mounting as claimed in claim 1, wherein the inflatable airbag module is attached to the lower portion by means of separate elements.

5. The mounting as claimed in claim 1, wherein the inflatable airbag module is fixed to the lower portion by means of screws passing through this module on being screwed into the thickness of this lower portion.

6. The mounting as claimed in claim 1, wherein the material of the lower portion is a composite material comprising glass-fiber reinforced polypropylene.

7. The mounting as claimed in claim 1, wherein the material of the upper portion is a thermoplastic elastomer-type material.

8. An arrangement of an inflatable airbag comprising a dashboard and an inflatable airbag module carried by a mounting as defined in claim 3.

9. An arrangement of an inflatable airbag comprising a dashboard and an inflatable airbag module carried by a mounting as claimed in claim 1 and wherein the upper portion of the mounting is integrated in the dashboard.

10. The arrangement of an inflatable airbag as claimed in claim 8, wherein the upper portion of the mounting is made of a material with a flexibility which is greater than that of a material of which the dashboard is made.

11. An arrangement according to claim 8, wherein the upper portion of the mounting is made of the same material as the dashboard.

12. An arrangement according to claim 8, wherein the upper portion of the mounting and the dashboard are both made of TPE.

13. An arrangement according to claim 9, wherein the upper portion of the mounting is made of the same material as the dashboard.

14. An arrangement according to claim 9, wherein the upper portion of the mounting and the dashboard are both made of TPE.

* * * * *